United States Patent
Hagen et al.

(10) Patent No.: US 9,740,926 B2
(45) Date of Patent: Aug. 22, 2017

(54) IDENTITY VERIFICATION USING BIOMETRIC DATA

(71) Applicant: IDchecker, Inc., San Francisco, CA (US)

(72) Inventors: Michael Hagen, Los Altos, CA (US); Pierre de Boer, Beverwijk (NL); Istvan Mandak, Amsterdam (NL)

(73) Assignee: IDchecker, Inc., San Diego, CA (US)

( * ) Notice: Subject to any disclaimer, the term of this patent is extended or adjusted under 35 U.S.C. 154(b) by 0 days.

(21) Appl. No.: 15/042,673

(22) Filed: Feb. 12, 2016

(65) Prior Publication Data

US 2016/0162729 A1 Jun. 9, 2016

Related U.S. Application Data

(62) Division of application No. 14/474,055, filed on Aug. 29, 2014, now Pat. No. 9,495,586.

(60) Provisional application No. 61/879,604, filed on Sep. 18, 2013, provisional application No. 61/879,613, filed on Sep. 18, 2013, provisional application No. 61/895,354, filed on Oct. 24, 2013.

(51) Int. Cl.
*G06K 9/00* (2006.01)
*G06K 9/46* (2006.01)
*G06T 11/60* (2006.01)
*G06F 21/32* (2013.01)

(52) U.S. Cl.
CPC ......... *G06K 9/00442* (2013.01); *G06F 21/32* (2013.01); *G06K 9/00228* (2013.01); *G06K 9/00288* (2013.01); *G06K 9/00912* (2013.01); *G06T 11/60* (2013.01)

(58) Field of Classification Search
CPC ........... G07C 9/00158; G07C 9/00563; G07C 9/00007; G07C 9/00031; G07C 9/00079; G06F 21/32; G06F 21/31; G06K 9/00221; G06K 9/00288
See application file for complete search history.

(56) References Cited

U.S. PATENT DOCUMENTS

| | | | |
|---|---|---|---|
| 8,831,361 | B2 | 9/2014 | Pintsov |
| 8,995,774 | B1 | 3/2015 | van Deventer et al. |
| 9,369,287 | B1 | 6/2016 | Sarvestani |
| 9,373,030 | B2 | 6/2016 | van Deventer et al. |
| 9,495,586 | B1 | 11/2016 | Hagen et al. |

(Continued)

OTHER PUBLICATIONS

"Machine Readable Travel Documents Part 11, Security Mechanishs for MRTDS", Doc 9303, International Civil Aviation Organization, Seventh Edition, 2015.

(Continued)

*Primary Examiner* — Kim Vu
*Assistant Examiner* — Michael Vanchy, Jr.
(74) *Attorney, Agent, or Firm* — Carr & Ferrell LLP

(57) ABSTRACT

A method for identity verification using biometric data is disclosed herein. The method comprises receiving, by a processor, an image of an identification document and receiving a video associated with a face of a user. A predefined number of frames is selected in the video. Based on the selection, it is determined whether the video depicts a live person. Additionally, the face of the user in the video is compared with the image of the identification document and, based on the comparing, results of the identity verification are provided.

18 Claims, 12 Drawing Sheets

(56) References Cited

U.S. PATENT DOCUMENTS

| | | |
|---|---|---|
| 9,665,754 B2 | 5/2017 | Hagen |
| 2004/0049401 A1* | 3/2004 | Carr ................... G06Q 10/02 705/325 |
| 2006/0057550 A1 | 3/2006 | Sahashi |
| 2006/0267737 A1 | 11/2006 | Colby |
| 2007/0109101 A1 | 5/2007 | Colby |
| 2007/0122004 A1 | 5/2007 | Brown et al. |
| 2007/0172155 A1* | 7/2007 | Guckenberger .. G06F 17/30247 382/305 |
| 2007/0200679 A1 | 8/2007 | Colby |
| 2007/0200680 A1 | 8/2007 | Colby |
| 2007/0200681 A1 | 8/2007 | Colby |
| 2007/0200684 A1 | 8/2007 | Colby |
| 2008/0046366 A1 | 2/2008 | Bemmel et al. |
| 2008/0144947 A1 | 6/2008 | Alasia et al. |
| 2008/0195858 A1 | 8/2008 | Nguyen |
| 2008/0211622 A1 | 9/2008 | Rindtorff et al. |
| 2008/0238681 A1 | 10/2008 | Rodgers |
| 2008/0279959 A1 | 11/2008 | Holmes |
| 2009/0154778 A1 | 6/2009 | Lei et al. |
| 2010/0052852 A1 | 3/2010 | Mohanty |
| 2010/0066072 A1 | 3/2010 | Paeschke et al. |
| 2010/0150348 A1 | 6/2010 | Fairbanks et al. |
| 2010/0245034 A1 | 9/2010 | D'Oliveiro et al. |
| 2010/0263034 A1 | 10/2010 | Banchelin |
| 2010/0329577 A1 | 12/2010 | Kitai |
| 2010/0332838 A1 | 12/2010 | Zhu et al. |
| 2011/0068173 A1 | 3/2011 | Powers et al. |
| 2011/0209192 A1 | 8/2011 | LeClerc Greer et al. |
| 2011/0309146 A1 | 12/2011 | Zazzu et al. |
| 2012/0011010 A1 | 1/2012 | Boulanouar |
| 2012/0154246 A1 | 6/2012 | Tietke et al. |
| 2012/0155700 A1 | 6/2012 | Huang |
| 2012/0229872 A1 | 9/2012 | Dolev |
| 2012/0230577 A1 | 9/2012 | Calman et al. |
| 2012/0299709 A1 | 11/2012 | Nishimura |
| 2013/0222119 A1 | 8/2013 | Tietke et al. |
| 2013/0243266 A1 | 9/2013 | Lazzouni |
| 2013/0305059 A1 | 11/2013 | Gormley et al. |
| 2013/0311788 A1 | 11/2013 | Faher et al. |
| 2014/0003717 A1 | 1/2014 | Brito et al. |
| 2014/0029857 A1 | 1/2014 | Kompalli et al. |
| 2014/0046954 A1 | 2/2014 | MacLean et al. |
| 2014/0052636 A1 | 2/2014 | Mattes |
| 2014/0058951 A1 | 2/2014 | Kuppuswamy |
| 2014/0230039 A1 | 8/2014 | Prakash et al. |
| 2014/0270400 A1 | 9/2014 | Natale et al. |
| 2015/0078671 A1 | 3/2015 | van Deventer et al. |
| 2015/0088776 A1 | 3/2015 | Parrish et al. |
| 2015/0199568 A1 | 7/2015 | van Deventer et al. |
| 2015/0347839 A1 | 12/2015 | Hagen |

OTHER PUBLICATIONS

"Machine Readable Travel Documents (MRTDs): History, Interoperability, and Implementation", Version: Release 1, Draft 1.4, International Civil Aviation Organization, Mar. 23, 2007.

Pooters, Ivo, "Keep Out of My Passport: Access Control Mechanisms in E-Passports", Jun. 15, 2008.

Kinneging, Tom A.F., "PKI for Machine Readable Travel Documents offering ICC Read-Only Access", Version 1.1, International Civil Aviation Organization, Oct. 1, 2004.

Final Office Action, Oct. 11, 2016, U.S. Appl. No. 14/722,058, filed May 26, 2015.

Advisory Action, Jan. 5, 2017, U.S. Appl. No. 14/722,058, filed May 26, 2015.

Non-Final Office Action, Feb. 14, 2017, U.S. Appl. No. 14/722,058, filed May 26, 2015.

Non-Final Office Action, May 31, 2016, U.S. Appl. No. 14/722,058, filed May 26, 2015.

Notice of Allowance, Jun. 30, 2016, U.S. Appl. No. 14/474,055, filed Aug. 29, 2014.

Non-Final Office Action, Oct. 17, 2014, U.S. Appl. No. 14/468,173, filed Aug. 25, 2014.

Notice of Allowance, Jan. 21, 2015, U.S. Appl. No. 14/468,173, filed Aug. 25, 2014.

Non-Final Office Action, Sep. 16, 2015, U.S. Appl. No. 14/722,058, filed May 26, 2015.

Non-Final Office Action, Nov. 10, 2015, U.S. Appl. No. 14/670,244, filed Mar. 26, 2015.

Notice of Allowance, Mar. 14, 2016, U.S. Appl. No. 14/670,244, filed Mar. 26, 2015.

Non-Final Office Action, Feb. 29, 2016, U.S. Appl. No. 14/474,055, filed Aug. 29, 2014.

Final Office Action, Mar. 1, 2016, U.S. Appl. No. 14/722,058, filed May 26, 2015.

Advisory Action, Mar. 28, 2016, U.S. Appl. No. 14/722,058, filed May 26, 2015.

* cited by examiner

Instructing User To Superimpose Human Face Images

IDENTITY VERIFICATION USING BIOMETRIC DATA

CROSS-REFERENCE TO RELATED APPLICATIONS

The present utility patent application is a divisional of, and claims the priority benefit of U.S. patent application Ser. No. 14/474,055, filed on Aug. 29, 2014, issued on Nov. 15, 2016 as U.S. Pat. No. 9,495,586, which in turn is related to and claims priority benefit of U.S. provisional application No. 61/879,604, filed on Sep. 18, 2013, U.S. provisional application No. 61/879,613, filed on Sep. 18, 2013, and U.S. provisional application Ser. No. 61/895,354, filed on Oct. 24, 2013. The contents of these related applications are incorporated herein by reference for all purposes to the extent that such subject matter is not inconsistent herewith or limiting hereof.

TECHNICAL FIELD

The present disclosure relates generally to data processing and, more specifically, to identity verification using biometric data.

BACKGROUND

Identity verification is important to a great variety of commercial and noncommercial transactions. Employers may need to verify the identities of their prospective employees for background checks or to comply with laws requiring companies to employ only individuals who may legally work in the country. Financial institutions may need to verify identity to prevent criminals from committing fraud by accessing resources or obtaining credit and other benefits of others. However, manual identity verification is time consuming and may require personal presence of the person whose identity is being verified. Thus, speedy and remote identity verifications are very important to prevent fraud, facilitate processing of personal documentation, and improve online transactions.

Biometric verification may be used to verify the identity of an individual in a reliable manner. Receiving appropriate data for biometric verification may improve verification efficiency and accuracy.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are methods and systems for identity verification using biometric data. The system for identity verification using biometric data may comprise a processor and a database communicatively coupled to the processor. The processor may be configured to receive an image of an identification document associated with a user (e.g., a passport, a driver's license, and so forth). The image may be captured by a camera of a client device associated by the user or selected by the user from the images stored in the client device. The processor may identify a photo of the holder of the identification document in the received image. To ensure that the user is the same person who is shown on the photo in the identification document, the processor may activate the camera of the client device and receive a video stream from the camera. The user may be instructed to direct the camera lens to his face so that the video stream shows the face of the user. The processor may select a predefined number of frames in the video (for example, the processor may randomly select four frames). The frames are analyzed to identify minor moves of the user's head, lips, eyes, and so forth. If the moves are identified, the processor may determine that the video depicts a live person. In such a way, fraud attempts using a still photo of the identification document holder may be eliminated.

Additionally, the system for identity verification using biometric data may compare the face from one of the video frames to the photo from the identification document image. The system for identity verification using biometric data may measure a distance between face parts and perform other analysis to check whether the video frame and the photo show the same person. Based on the determining whether the video depicts a live person and the faces comparison, the identity of the user may be verified and the system may confirm that the user is a true holder of the identification document. Alternatively, the system for identity verification using biometric data may determine that the user is not the true holder of the identification document. In some cases, the system may determine that identity verification is not possible, for example, because of poor quality of the identity document image or due to other reasons. The results of the identity verification may be provided to a requestor of the identity verification and/or the user.

In some embodiments, the system for identity verification using biometric data may consider further verification procedures to improve accuracy and reliability of the identity verification. Thus, the system for identity verification using biometric data may check authenticity of the identification document using authenticity characteristics, retrieve and analyze social data, and so forth.

Additionally, to facilitate the faces comparison and improve reliability of the verification results, the system for identity verification using biometric data may instruct a user on taking a photograph for biometric verification of the identification document.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
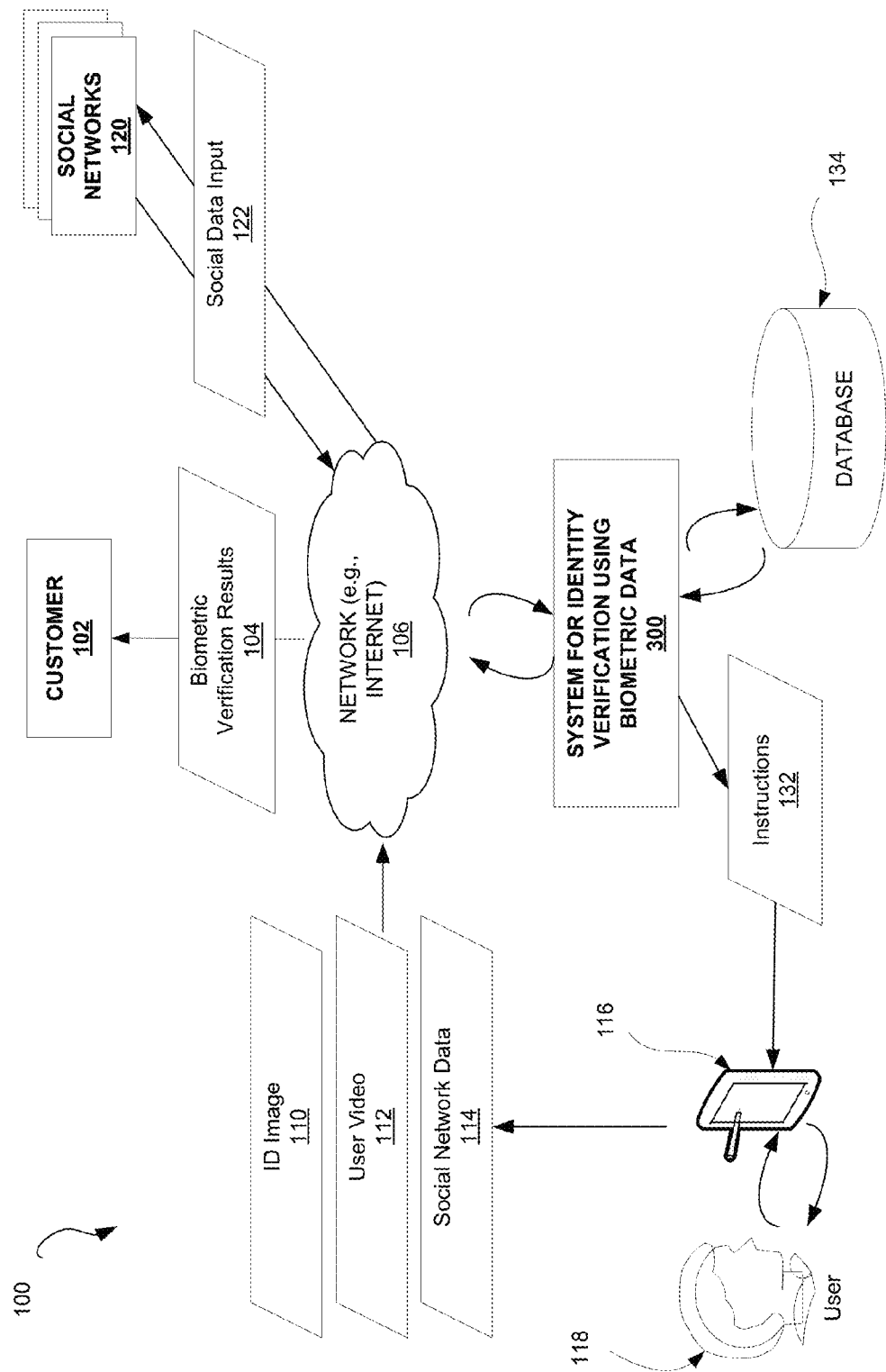
FIG. 1 illustrates an environment within which systems and methods for identity verification using biometric data can be implemented.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

With most of the population online and growing increasingly mobile, new ways of establishing user identity are needed. Among others, online transactions, electronic delivery of services, and electronic banking all require identity verifications.

A system for identity verification using biometric data is provided. The system for identity verification using biometric data may automate handling and verification of identification documentation, such as government issued IDs, driver licenses, and passports. An image of an identification (ID) document may be received by the system for identity verification using biometric data. The image may be captured by a client device (e.g., a phone camera, a tablet personal computer (PC) camera, and so forth), scanned by an external device, or stored on the client device and selected by a user for verification. Additionally, a video of a face of the user may be received. The video may be captured by a camera associated with the client device. The system may analyze the video and compare the video to a facial image extracted from the image of the ID document. The analysis may determine whether the two images depict the same person and thus verify the identity of the user. The analysis may also determine whether a live person is shown on the video and whether the person in the video is the same person as shown on the ID document. Accordingly, the results of identity verification based on the analysis may be generated and provided to a third person and/or user. If the verification is successful, the results may confirm the authenticity and ownership of the ID document. If, on the other hand, the results are not successful, the results may inform a requesting party that the authenticity and/or ownership of the ID document could not be verified. Additionally, various data associated with the ID document may be provided (for example, issue date, holder's name, holder's age, and so forth).

To improve accuracy of results of identity verification, the system for identity verification using biometric data may consider additional factors. Thus, the system may collect social data associated with one or more social network accounts specified by the user. The social network accounts may include personal accounts in social networks, blogs, personal pages, and so forth. Social data associated with social network accounts of the user may be received and analyzed. For example, it may be determined when the account was open, how many connections are associated with the account, whether the account photo depicts the same person as the ID document, and so forth. Furthermore, social interactions (likes, tags, comments, and the like), user information, and message content may be analyzed to compare the social data to the information available from the ID document. Based on the analysis, further results of the identity verification may be generated and used to adjust the results of the identity verification.

Furthermore, authenticity characteristics of the ID document may be checked. A font, a microtext, a hologram, and other characteristics of the ID document may be checked and their presence and/or correctness may be considered in generating the results of identity verification.

Characteristics of the photos used for analysis may, however, affect verification results; for example, poor facial images can cause false negative results. To facilitate analysis and improve reliability of the verification results, a user whose identity is being verified may be provided with instructions on taking a photo for identity verification. The instructions on taking a photograph may be provided to a user by the system for identity verification using biometric data.

Referring now to drawings, FIG. 1 illustrates an environment 100 within which the systems and methods for identity verification using biometric data can be implemented, in accordance to some embodiments. A user 118, whose identity needs verification, may send an image associated an ID document (ID image 110) to a system 300 for identity verification using biometric data via a network 106 (e.g., the Internet).

The network 106 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 106 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 106 may be a network of data processing nodes that are interconnected for the purpose of data communication.

The ID image 110 may include a picture or a scan of the ID document. Furthermore, a user video 112 including the face of the user 118 may be taken by a camera associated with the user 118. The camera may be associated with a client device 116 (for example, a smart phone, a notebook, a PC, and so forth). The user video 112 and the ID image 110 may be received by the system 300 for identity verification using biometric data. The user video 112 may be processed by the system 300 to extract one or more frames. Alternatively, the one or more frames can be extracted before the user video 112 is received by the system 300. The system 300 may determine whether the user video 112 shows a live person by analyzing the one or more frames of the user video 112. If the analysis confirms differences in the frames consistent with head movements of a live person, it may be determined that a live person is shown in the user video 112. The stream of the user video 112 may be analyzed for 2-3 seconds to measure objects on the face and to detect any motion. Furthermore, the face in the frames may be compared to the face associated with the ID image 110 to determine whether the same person is shown.

In some embodiments, the ID image 110 and the user video 112 or the frames of the user video 112 may be transmitted to a third party for analysis. Alternatively, third party software integrated in the system 300 may be used for the analysis.

Additionally, the system 300 may utilize data input associated with the user 118 in social networks and other online resources as additional factors for identity verification. For this purpose, the user 118 may provide social network data 114 related to accounts of the user 118 in social networks 120 or other online resources. The system 300 may retrieve social data input 122 associated with the social network accounts via the network 106 and analyze the social data input 122 for the age of the account, social interactions, and other parameters.

In some embodiments, the user 118 may be prompted to read one or more alphanumeric characters to encourage the user 118 to move his lips. Thus, determining that the user video 112 depicts a live person may be simplified. Additionally, an audio of a user speech may be recorded and transmitted to the system 300 for further verifications. Moreover, the ID image 110 may be checked for authenticity characteristics, such as proper font, microtext, holograms, and so forth. All the factors described above may be analyzed to generate biometric verification results 104.

Biometric verification results 104 may be provided to a customer 102 who requested the identity verification (e.g., a prospective employer, a financial institution, an online merchant, a governmental organization, and so forth). Additionally, the biometric verification results 104, the ID image 110, and/or the one or more frames may be stored to a database 134.

In some embodiments, the biometric verification results 104 may be provided in an electronic form and may confirm that the ID document is authentic and belongs to the person being verified. Alternatively, the biometric verification results 104 may inform a requestor that the ID document is forged or that the status of the document could not be determined. Additionally, the biometric verification results 104 may inform the requestor that the ID document is authentic but the person being verified could not be confirmed as the rightful owner of the ID document. Moreover, the biometric verification results 104 may include various data associated with the ID document.

In some embodiments, the system 300 may give instructions 132 to the user 118 on capturing the ID image 110 and/or the user video 112. The instructions 132 may be provided via a user interface and/or other facilities of the client device 116. The instructions 132 may be provided as visual aids, marks, or directions shown on a screen of the client device 116, voice or sound codes or commands, haptic or light signals, and/or any other signals.

According to the instructions 132, the user 118 may take a photograph of his ID document. In some embodiments, the ID photo may be received from external devices, sent to the user device via a network, or stored in a memory of the client device 116. The photograph may be analyzed to determine whether an image of a human face shown on the ID document can be extracted.

The extracted face may be displayed on a screen of the client device 116 as partially transparent. The face may be enclosed by a region border of a specific shape (for example, an ellipse). The camera associated with the client device 116 may provide a video stream. The partially transparent facial image extracted from the ID document can overlap with the video stream so that the image from the video stream is seen through the extracted facial image. The face of the user may be detected in the video stream and also enclosed by a similarly shaped region border.

Additionally, in line with further instructions, the user 118 may superimpose a user face detected in a stream of the user video 112 from the camera of the client device 116 on a human face extracted from the ID image 110. When the face in the video stream and the face from the ID image 110 coincide, the system 300 causes the camera to capture a photograph of the user 118 or the user video 112. The system 300 transmits the ID image 110 and the user video 112 (or the photograph of the user 118) to the system 300 and/or third party.

Figure 2:
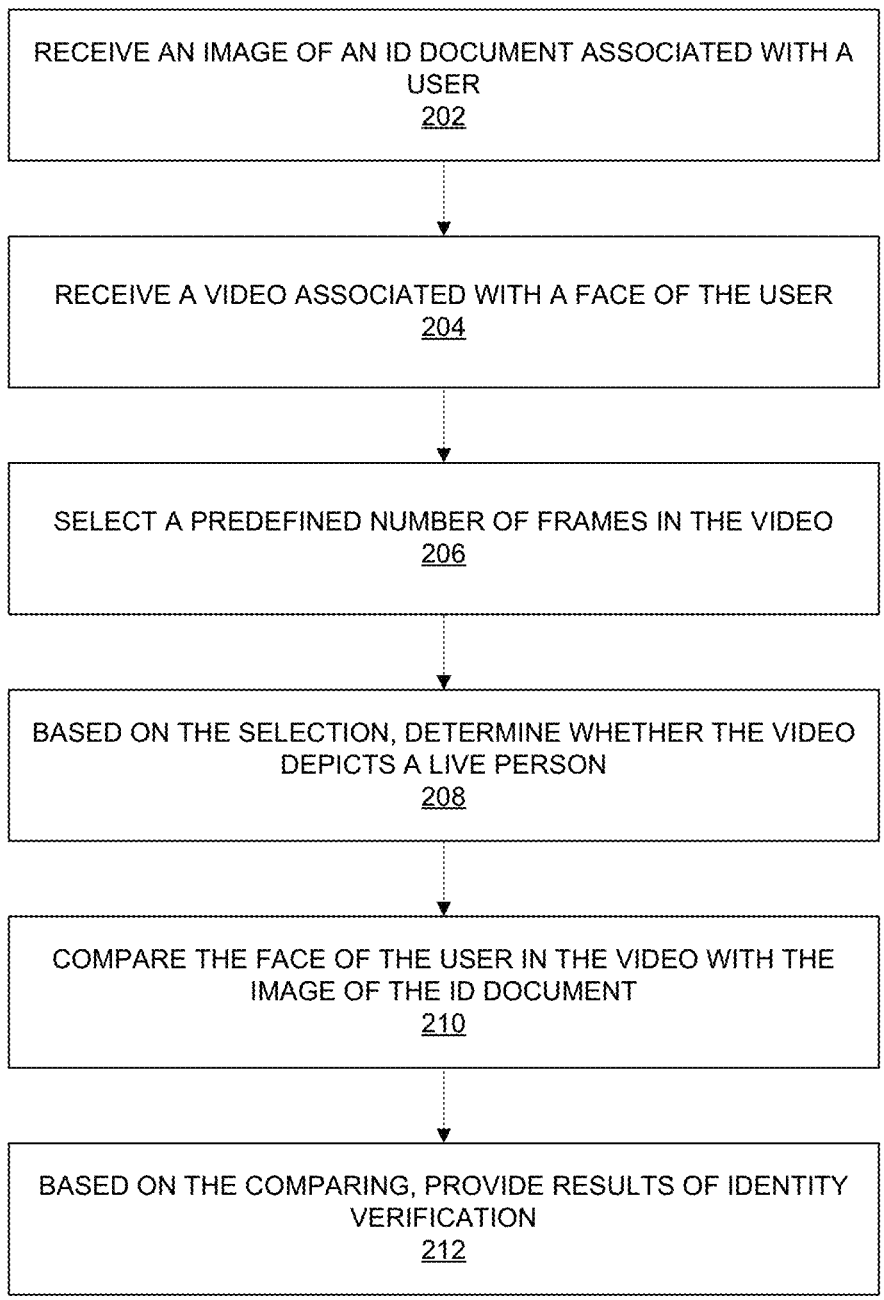
FIG. 2 illustrates a process flow diagram showing a method for identity verification using biometric data.

FIG. 2 is a process flow diagram showing a method 200 for verifying an ID document using biometric data within the environment described with reference to FIG. 1. The method 200 may commence with receiving an image associated with an ID document associated with a user at operation 202. The ID document may include a government issued ID, a student ID, an employment ID, a driver's license, a passport, a travel document, and so forth. The received image may include a picture, a scan, and so forth. Additionally, a video of the face of the user may be received at operation 204. The video may be, for example, 3-5 seconds long and captured by a camera associated with the user (for example, a standalone camera, a camera of a user device, such as a smart phone, a PC, a tablet PC, and so forth).

In some embodiments, one or more alphanumeric characters may be provided to the user to be read by the user as the video is captured. For example, the alphanumeric characters may be displayed on a display of the user device used to capture the video. In this way, the differences between video frames can be more pronounced due to the reader's mouth movement, thereby facilitating verification of the person as a live person. Additionally, as the user reads the characters, the voice of the user may be recorded by the user device and the recording analyzed for comparison to the displayed alphanumeric characters. The results of this comparison can be used as an additional authentication factor in the biometric verification.

In the video received, a predefined number of frames may be selected randomly at operation 206. For example, the predefined number may include two to four or more frames. The selected frames may be analyzed to detect voluntary and involuntary movements, blinking, mimics, and so forth. The selected frames may be analyzed for 2-3 seconds to measure features of the face and to detect any motion. Based on these movements, it may be determined that the video shows a live person at operation 208.

To confirm the authenticity of the claimed identity, the face in the video may be compared to the image associated with the ID document at operation 210. To perform this comparison, measurements of face parameters in the video and in the ID document can be determined and matched. In some embodiments, the comparison may be performed partially or entirely using third party software. Based on the comparison, results of the identity verification may be generated and provided to a requestor and/or user at operation 212.

Additionally, the image associated with the ID document may be analyzed for authenticity characteristics typically associated with ID documents. Such inherent authenticity characteristics of ID documents may be checked to confirm that the ID document is not forged.

If it is determined that the video shows a live person, the person shown matches the photo associated with the ID document, and the ID document includes authenticity characteristics normally associated with ID documents of the same type, the identity of the user may be verified. If some of the results of any of the verifications associated with the process are negative, the identity may be not verified. In some cases, the result may state that verification cannot be performed.

In some embodiments, additional verifications to confirm compliance of ID data with one or more further criteria may be performed. For example, it may be determined whether the holder of the ID document has attained a certain age; is a particular gender; has a particular height and/or weight; ascertain restrictions associated with the holder, and so forth.

Additionally, data present on the ID document (for example, name of the holder, issue date, and so forth) may be extracted from the ID image (for example, by optical character recognition) and provided to the requestor in a textual form.

Figure 3:
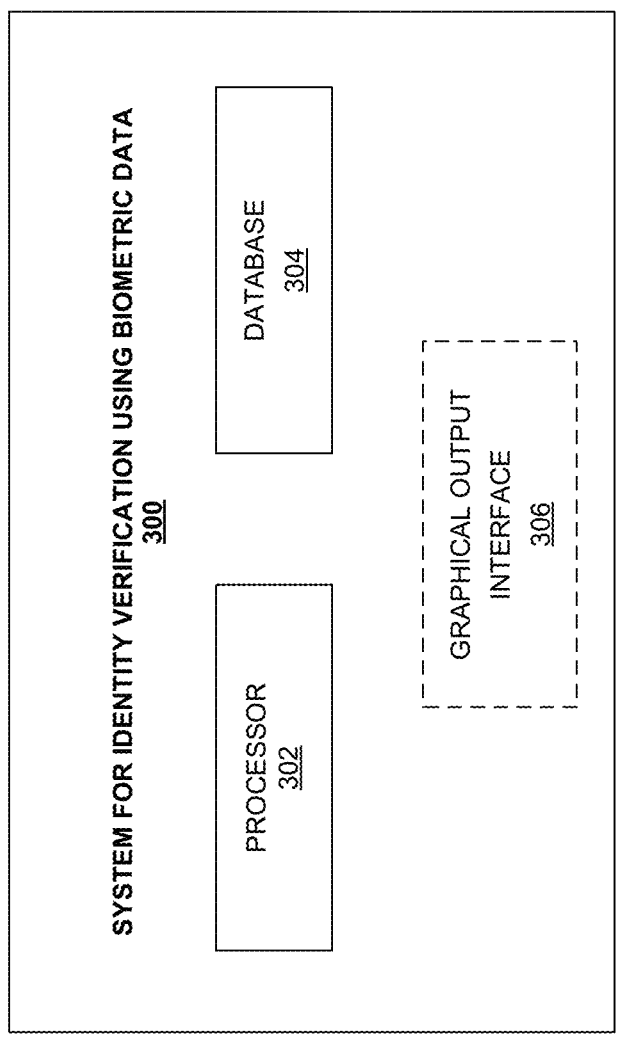
FIG. 3 illustrates a block diagram showing a system for identity verification using biometric data.

FIG. 3 shows a detailed block diagram of the system 300 for identity verification using biometric data, in accordance with an example embodiment. The system 300 may include a processor 302, a database 304, and, optionally, a graphical output interface 306. The processor 302 may be configured to receive an image associated with an ID document and a video associated with a user. The image and the video may be received by the processor 302 and stored in the database 304. The processor 302 may randomly select a predefined number of frames in the video and analyze the selected frames to detect movements of the person in the frames and differences in the position and mimics. To motivate the user to move more actively when the video is captured and/or to record the voice of the user as an additional verification factor, one or more alphanumeric characters may be provided to the user via a graphical output interface 306. For example, the user may be asked to read alphanumerical characters displayed on a screen of a device associated with the user. The video of the user may be captured while the user reads the digits. Additionally, an audio can be recorded as the user reads the alphanumerical characters for additional authenticity verifications. Based on the recorded movements and/or mimics, it may be determined that the video shows a live person and not a still image (e.g. a photo).

Additionally, the processor 302 may compare the face in the video with the image on the ID document. Based on the comparison, the processor 302 may determine that the user is a rightful owner of the ID document. Moreover, the image of the ID document may be analyzed to check authenticity characteristics of the ID document. The processor 302 may provide results of the verification based on the analysis. The operations of the biometric verification are described in more detail below with reference to FIGS. 4-6.

Figure 4:
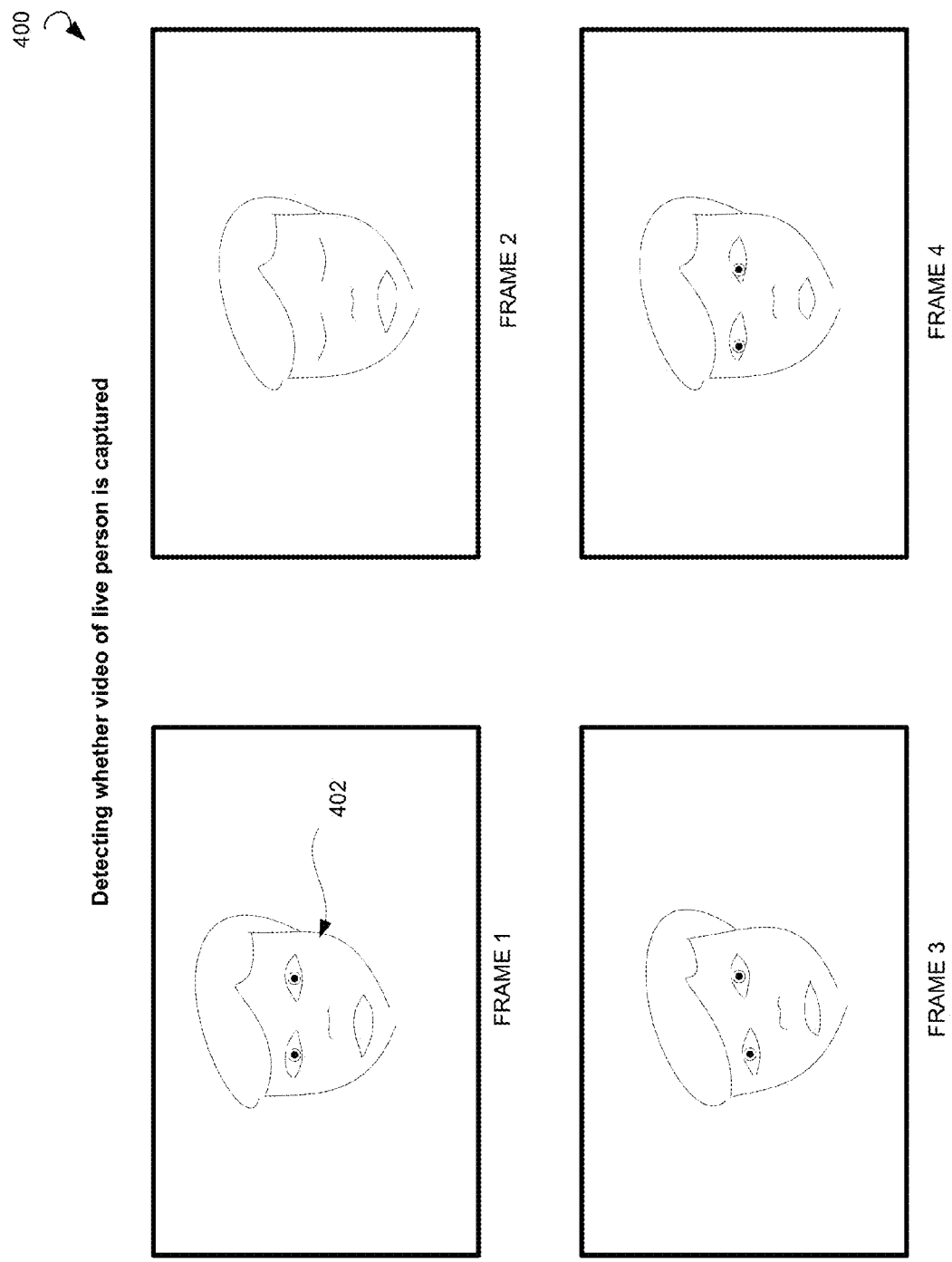
FIG. 4 illustrates video frames extracted from a user video.

FIG. 4 illustrates a process 400 for detecting whether a video of a live person is captured, in accordance with some embodiments. Frames 1-4 may be randomly selected from a video stream received using a camera associated with the user. Even though FIG. 4 shows four frames selected, any other number of frames may be selected. Most commonly, two frames may be used. The video stream may be, for example, 3-5 seconds long.

A user head 402 may be identified in the frames 1-4. The frames 1-4 may be analyzed to detect movements of the user head, blinking, mimics, and so forth. Detecting such movements or mimics may prove that the video captured is associated with a live person.

Figure 5:
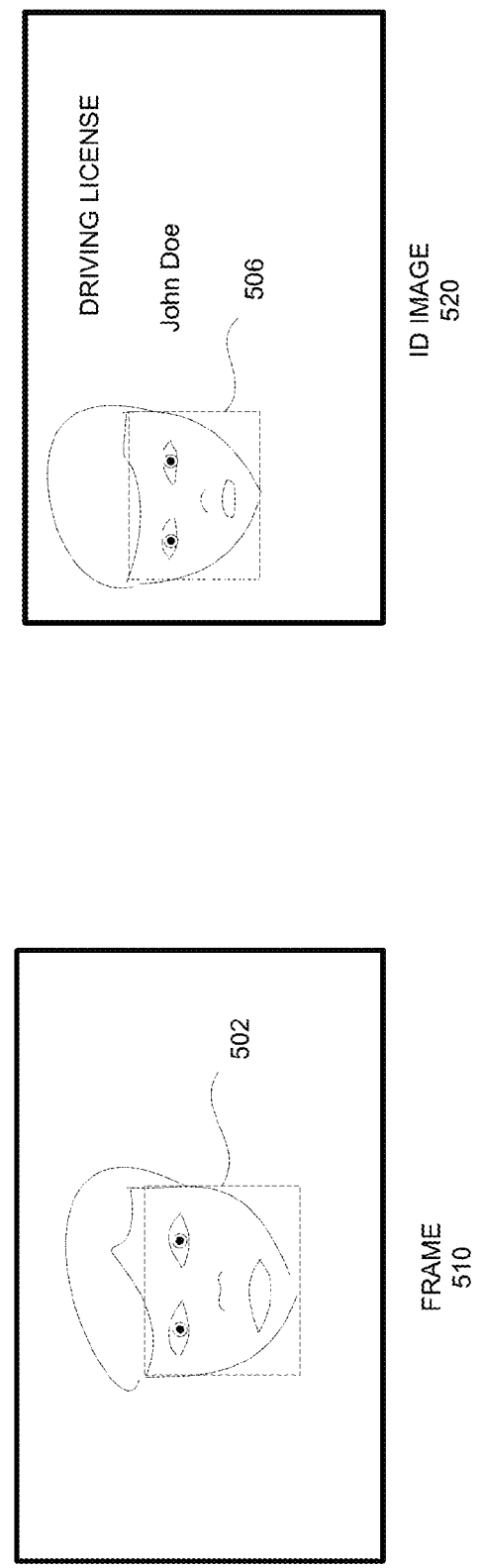
FIG. 5 illustrates a method for comparing a video frame with an identification document image.

FIG. 5 illustrates a process 500 for comparing a user face and an ID image, in accordance with some embodiments. One of the frames associated with the video stream, frame 510, may be processed to identify a user face 502 present in the frame 510. Parameters of the user face 502 in the frame 510 may be determined and compared to the measurements of a face 506 shown in the ID image 520. For example, the following parameters may be compared: distance between eyes, nose, mouth, jaw edges, and so forth. Based on the comparison, a similarity score representing the faces 502 and 506 matching may be calculated. According to the score, the faces 502 and 506 may be considered matching or non-matching. For example, a match can may be determined if the score exceeds a predefined value (for example, 80%).

In some embodiments, the comparison may be performed using third party software embedded in system 300 for identity verification using biometric data. Alternatively, the ID image 520 and the video or frame 510 may be transmitted for analysis to a third party.

Figure 6:
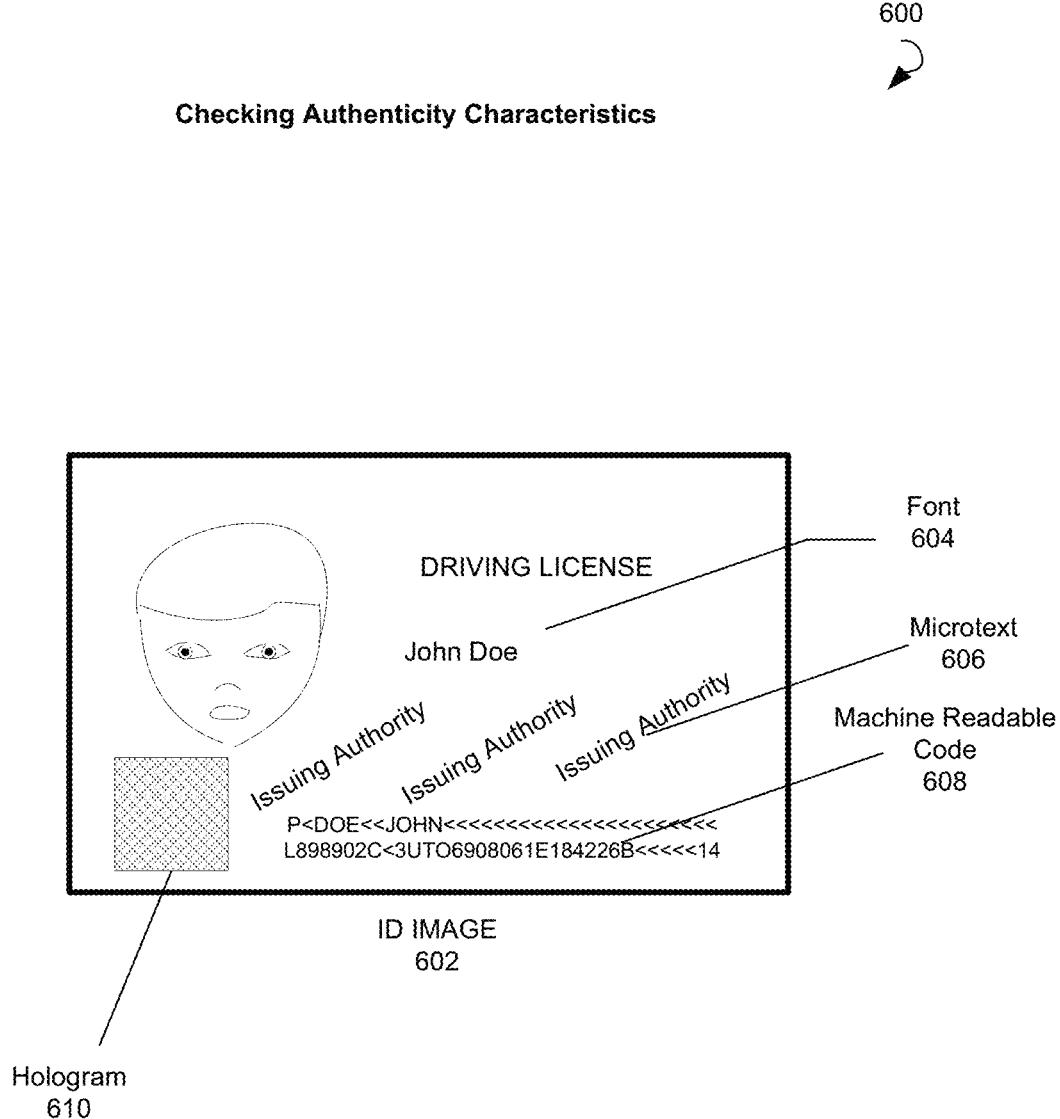
FIG. 6 illustrates a method for checking authenticity characteristics of an identification document.

Furthermore, the authenticity of the ID document may be checked by a process 600 as shown in FIG. 6. For this purpose, the type of the ID document associated with an ID image 602 may be determined. For example, the ID document may be classified as a US driver's license. Accordingly, authenticity characteristics inherent to this type of document may be retrieved using a network from third party sources or from the database associated with the system 300 for identity verification using biometric data. The authenticity characteristics may include a specific font 604 used for a certain field, microtext 606 lettering on the document, holograms 610, machine readable code 608, and so forth. Thus, the ID on the ID image 602 may be considered authentic if it has the retrieved characteristics. Additionally, data associated with machine readable code 608 may be read and compared to the data specified as associated with the ID document (for example, holder's name, age, and so forth).

In some embodiments, the ID image 602 can be visually verified by an identity verification professional. Thus, human verification may be performed when the status of the document cannot be determined automatically.

The results of the verification may be determined based on the performed checks and analyses and provided to the customer electronically via a network. The results may verify the claimed identity as authentic and associated with the user, verify the claimed identity as authentic but not associated with the user, declare the identity fraudulent, or state that the verification is impossible. Additionally, the result may include data associated with the ID document in an electronic form.

Figure 7:
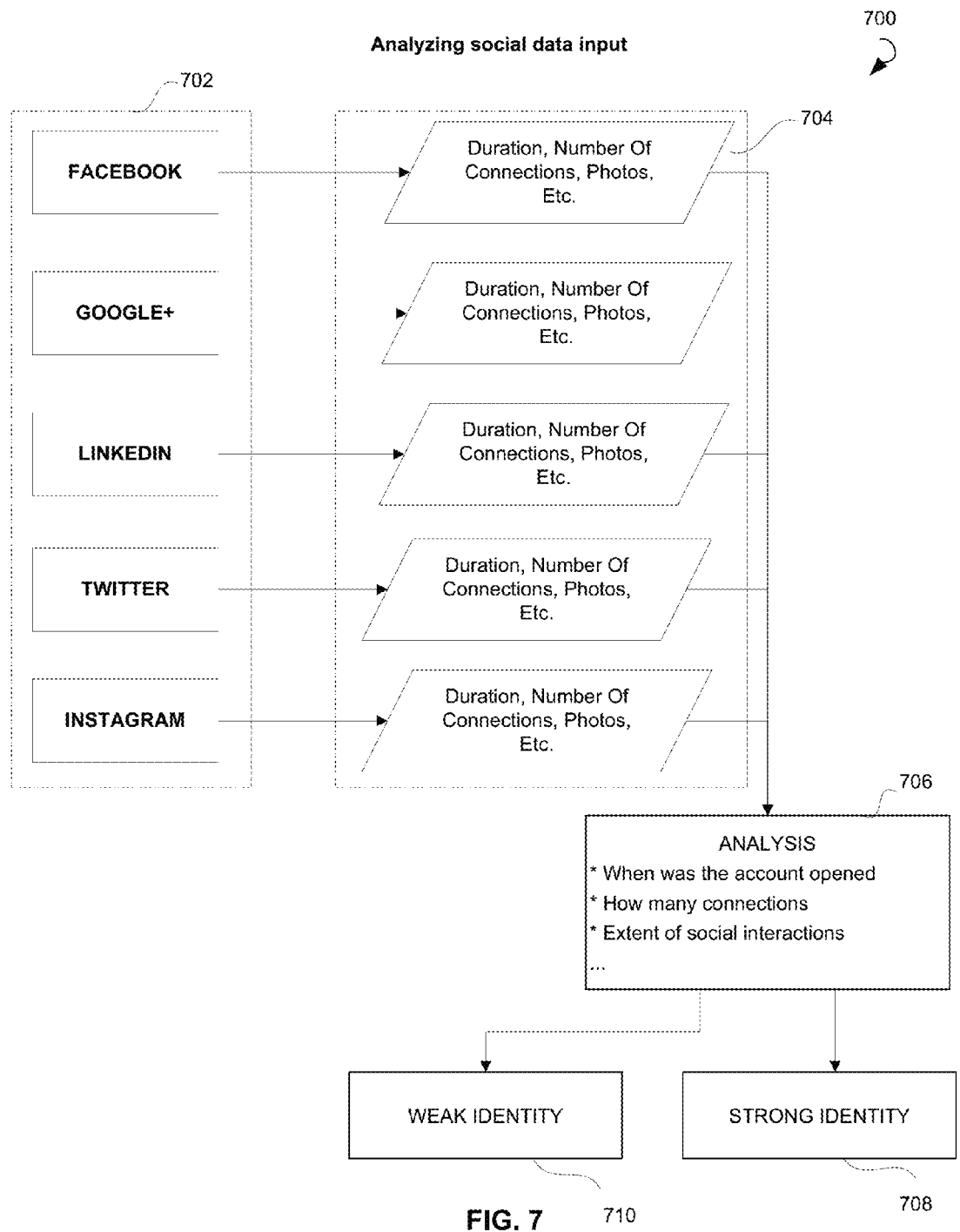
FIG. 7 illustrates a flow diagram showing the analysis of a social data input.

FIG. 7 illustrates a process 700 for retrieving and analyzing social data input 704. The social data input 704 may be retrieved from accounts associated with the user in social networks 702. For example, the social networks 702 may include Facebook, Google+, LinkedIn, Twitter, Instagram, and so forth. The retrieved social data input 704 may be historical, current, quantitative, and so forth. For example, the retrieved social data input 704 may include a date when the account was created, number of connections or friends, and activities or social interactions (comments, tags, likes, and so forth).

The social data input 704 may be analyzed 706. If the account has been open for a long period of time, has many connections, and the user has been actively engaging in various social interactions, the identity associated with the account may be considered strong 708. If the account is new and has few connections and comments, it may be considered to be associated with a weak identity 710.

Figure 8:
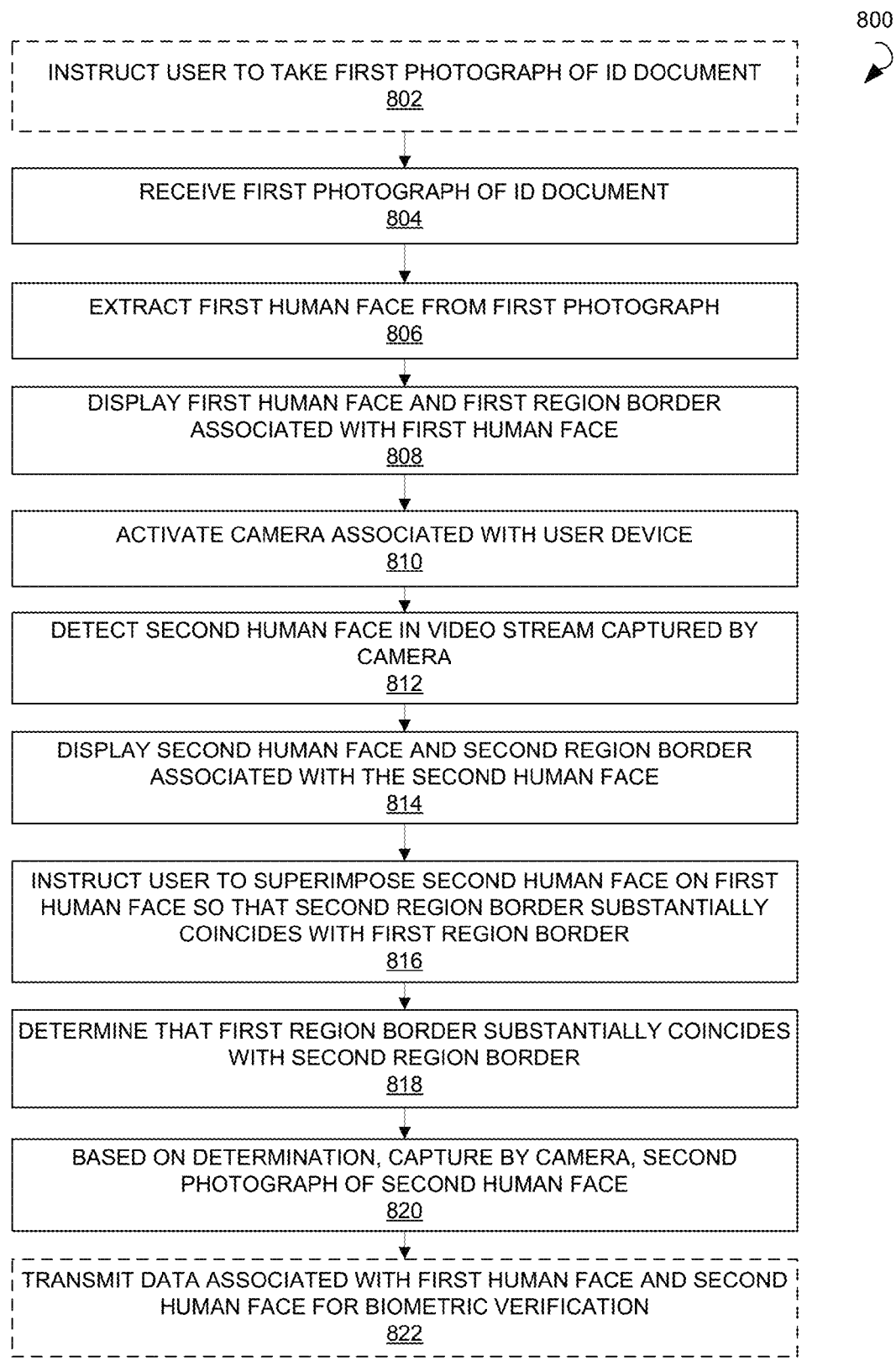
FIG. 8 illustrates a method for instructing a user on taking a photograph for biometric verification of an identification document.

FIG. 8 is a process flow diagram showing a method 800 for instructing a user on taking a photograph for biometric verification of an identification document within the environment. The method 800 may commence with instructing a user to take a first photograph of an ID document associated with the user at optional operation 802. The instructions may be shown on a screen of a user device, such as a smart phone, tablet PC, and so forth. The ID document may include a government issued ID, a student ID, an employment ID, a driver's license, a passport, a travel document, and so forth. Alternatively, the user may select a photograph stored in a memory of the user device or received from another person. The first photograph may be received by the processor at operation 804. The received photograph may include a picture, a scan, and so forth. The photograph may be analyzed to identify a human face in the ID document, and the human face may be extracted at operation 806 and displayed on a screen of the user device via the user interface at operation 808. The human face may be displayed partially transparent. The degree of transparency may be set in accordance to a predetermined opacity level. The displayed human face may be enclosed by a first region border. The border may have an elliptical shape and encircle the human face extracted from the ID photo and displayed on the screen of the user device.

At operation 810, a camera of the user device may be activated and a video stream from the camera may be also displayed on the screen. A second human face may be found in the video stream and enclosed by a second region border at operation 812. The video stream with the second human face and the second region border may be displayed in the background at operation 814 so that the transparent human face from the ID photo overlaps the video stream image. The second region border may differ from the first one.

Movements of the face in the video stream may be detected, and the second region border may follow the movements of the face in the video stream. Instructions on how to superimpose the faces on the screen may be provided to the user at operation 816. The instructions may include visual directions, sound and/or voice aids, light and haptic signals, and so forth. The user, following the instructions, may get the faces in the video stream to overlap. Overlapping may be detected based on the position of the region borders at operation 818. When the borders coincide, a photo of the second human face may be taken at operation 820.

At optional operation 822, data related to both faces may be transmitted to the system for identity verification using biometric data for comparison. In some embodiments, the data may be further transmitted to a third party for identity verification.

The operations for instructing a user on taking a photograph for biometric verification of an ID document are described in more detail below with reference to FIGS. 9-11.

Figure 9:
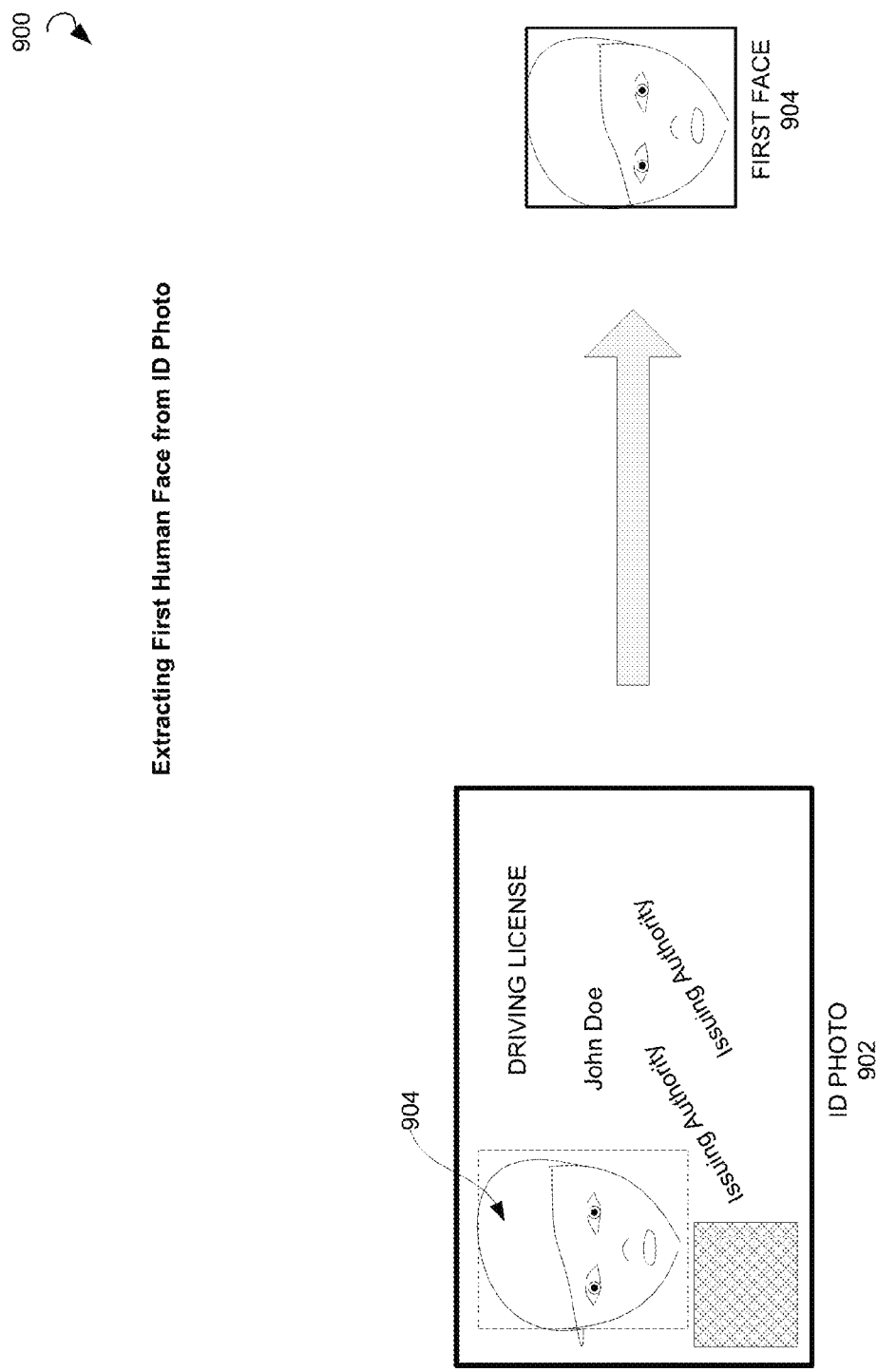
FIG. 9 illustrates a process for extracting a first human face from a first photograph of an identification document.

FIG. 9 illustrates a process 900 for extracting a first human face from a photograph of an ID document, in accordance with some embodiments. An ID photo 902 may be taken by a camera of a user device, such as a smart phone or a tablet PC, or the photo may be stored in the memory of the user device. The ID photo 902 may be analyzed to determine a first face 904 shown on the ID document. The first face 904 may be extracted from the ID photo 902.

Figure 10:
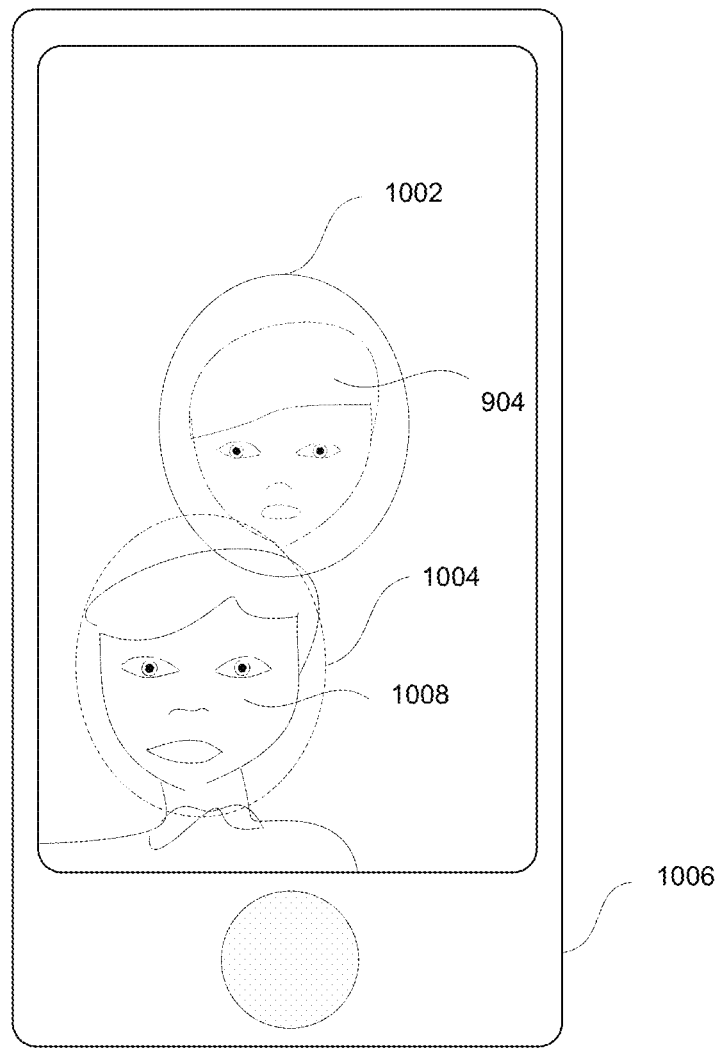
FIG. 10 illustrates a process of instructing a user to superimpose two human face images.

As FIG. 10 illustrates in a process 1000, the first face 904 may be displayed on the screen of the client device 1006. The first face 904 may be enclosed by a first region border 1002 having a substantially elliptical form repeating the form of the human face. The first face 904 may be displayed as semi-transparent. Thus, a camera feed may be seen through the first face 904. The camera feed may include a second face 1008. The second face 1008 may belong to the user or another person. The second face 1008 may be detected and enclosed by a second region border 1004. The second region border 1004 may differ from the first region border 1002. For example, it may include a broken line. The user may be instructed to superimpose both faces 904 and 1008 shown on the screen.

Figure 11:
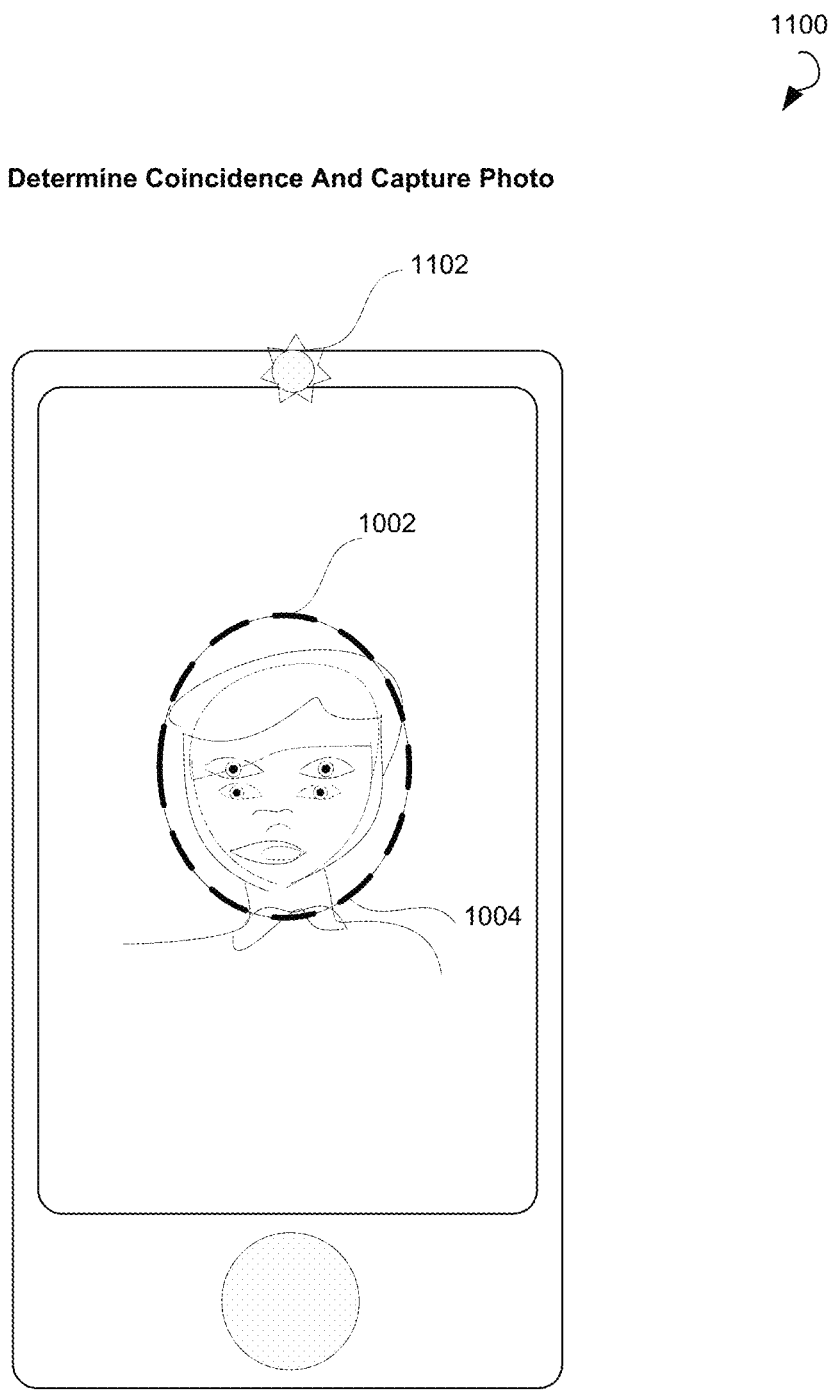
FIG. 11 illustrates a process of determining coincidence of human faces and capturing a second photograph.

The system may ascertain that the faces 904 and 1008 are superimposed based on coincidence of the region borders 1002 and 1004 as shown in a process 1100 by FIG. 11. When the region borders 1002 and 1004 coincide, a photo is taken by the camera 1102 of the client device. The photo from the ID document and the photo taken by the camera 1102 may be transmitted for comparison for the system for identity verification using biometric data. Since the first face 904 on the first photo is matched in size and position to the second face 1008 on the second photo, the verification process may be facilitated. In such a way, the number of false negative results may be minimized.

Figure 12:
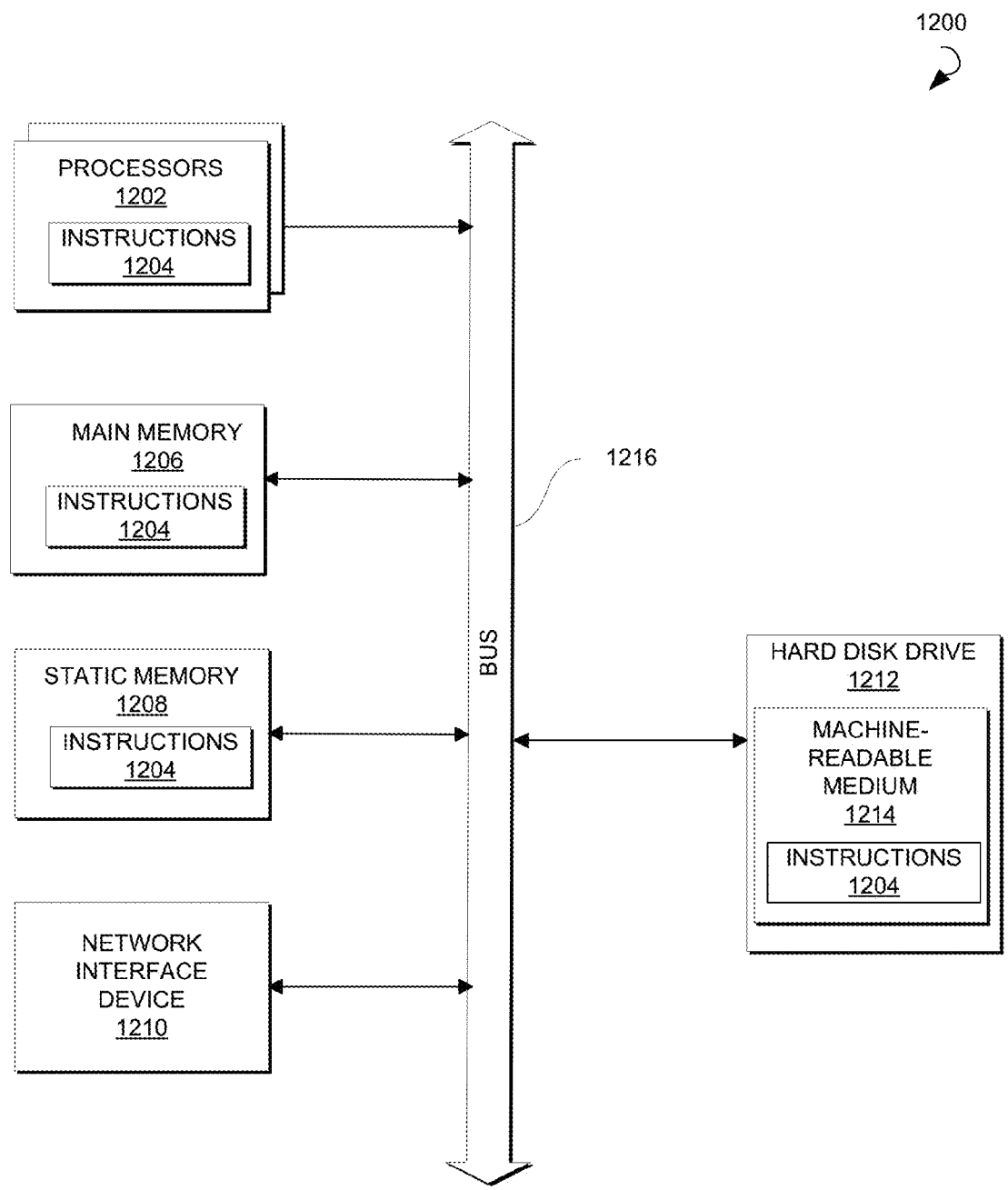
FIG. 12 shows a diagrammatic representation of a computing device for a machine in the exemplary electronic form of a computer system, within which a set of instructions for causing the machine to perform any one or more of the methodologies discussed herein can be executed.

FIG. 12 shows a diagrammatic representation of a computing device for a machine in the exemplary electronic form of a computer system 1200, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a PC, a tablet PC, a set-top box (STB), a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor or multiple processors 1202, a hard disk drive 1212, a main memory 1206 and a static memory 1208, which communicate with each other via a bus 1216. The computer system 1200 may also include a network interface device 1210. The hard disk drive 1212 may include a machine-readable medium 1214, which stores one or more sets of instructions 1204 embodying or utilized by any one or more of the methodologies or functions described herein. The instructions 1204 can also reside, completely or at least partially, within the main memory 1206 and/or within the processors 1202 during execution thereof by the computer system 1200. The main memory 1206 and the processors 1202 also constitute machine-readable media.

While the machine-readable medium 1214 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "machine-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, Python, JavaScript, Go, or other compilers, assemblers, interpreters or other computer languages or platforms.

Thus, computer-implemented methods and systems for identity verification using biometric data are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A computer-implemented method for instructing a user on taking a photograph for biometric verification of an identification document, the method comprising:
   receiving, by a processor, a first photograph of the identification document;
   extracting, from the first photograph, by the processor, a first human face;
   displaying, via a user interface associated with a user device, the first human face and a first region border associated with the first human face, the first human face having a predetermined opacity level and the first region border enclosing the first human face;
   activating a camera associated with the user device;
   detecting, by the processor, a second human face in a video stream captured by the camera;
   displaying, via the user interface, the second human face and a second region border associated with the second human face, the second region border enclosing the second human face;
   instructing the user to superimpose the second human face on the first human face so that the second region border substantially coincides with the first region border;
   determining, by the processor, that the first region border substantially coincides with the second region border; and
   based on the determination, capturing a second photograph of the second human face using the camera.

2. The method of claim 1, wherein the first photograph includes a picture, a scan, and a video frame.

3. The method of claim 1, further comprising instructing the user, via the user interface, to take the first photograph of the identification document.

4. The method of claim 1, further comprising transmitting, by the user device, data associated with the first human face and the second human face for biometric verification.

5. The method of claim 1, wherein the first region border and the second region border have a substantially elliptical form.

6. The method of claim 1, wherein the second human face and the second region border are displayed in a background so that the first human face and the first region border overlap the second human face and the second region border.

7. The method of claim 1, wherein the second region border differs from the first region border.

8. The method of claim 1, further comprising:
   detecting, by the processor, movement of the second human face in the video stream; and
   based on the detecting, moving the second region border to follow the second human face.

9. The method of claim 1, wherein the predetermined opacity level comprises a degree of transparency set by the user.

10. A system for instructing a user on taking a photograph for biometric verification of an identification document, the system comprising a processor and a memory comprising computer-readable instructions for execution by the processor, wherein the processor is configured to:
    receive a first photograph of the identification document;
    extract, from the first photograph, a first human face;
    display, via a user interface associated with a user device, the first human face and a first region border associated with the first human face, the first human face having a predetermined opacity level and the first region border enclosing the first human face;
    activate a camera associated with the user device;
    detect a second human face in a video stream captured by the camera;
    display, via the user interface, the second human face and a second region border associated with the second human face, the second region border enclosing the second human face;
    instruct the user to superimpose the second human face on the first human face so that the second region border substantially coincides with the first region border;
    determine that the first region border substantially coincides with the second region border; and based on the determination, capture a second photograph of the second human face using the camera.

11. The system of claim 10, wherein the first photograph includes a picture, a scan, and a video frame.

12. The system of claim 10, wherein the processor is further configured to instruct the user, via the user interface, to take the first photograph of the identification document.

13. The system of claim 10, wherein the processor is further configured to transmit, by the user device, data associated with the first human face and the second human face for biometric verification.

14. The system of claim 10, wherein the first region border and the second region border have a substantially elliptical form.

15. The system of claim 10, wherein the second human face and the second region border are displayed in a background so that the first human face and the first region border overlap the second human face and the second region border.

16. The system of claim 10, wherein the second region border differs from the first region border.

17. The system of claim 10, wherein the processor is further configured to:
  detect movement of the second human face in the video stream; and
  based on the detecting, move the second region border to follow the second human face.

18. The system of claim 10, wherein the predetermined opacity level comprises a degree of transparency set by the user.

\* \* \* \* \*